Nov. 10, 1964 J. A. FRAUNFELDER 3,156,871

MAGNETIC RECORDING SYSTEM EMPLOYING MEANS FOR GENERATING CORRECTION PULSES ONLY BETWEEN CONSECUTIVE SIMILAR INFORMATION PULSES

Filed Jan. 11, 1962 2 Sheets-Sheet 1

INVENTOR
JAMES A. FRAUNFELDER

BY Edward M. Fussell

ATTORNEY

United States Patent Office 3,156,871
Patented Nov. 10, 1964

3,156,871
MAGNETIC RECORDING SYSTEM EMPLOYING MEANS FOR GENERATING CORRECTION PULSES ONLY BETWEEN CONSECUTIVE SIMILAR INFORMATION PULSES

James A. Fraunfelder, North Wales, Pa., assignor to Sperry Rand Corporation, New York, N.Y., a corporation of Delaware Filed Jan. 11, 1962, Ser. No. 165,490
12 Claims. (Cl. 328—63)

Figure 1:
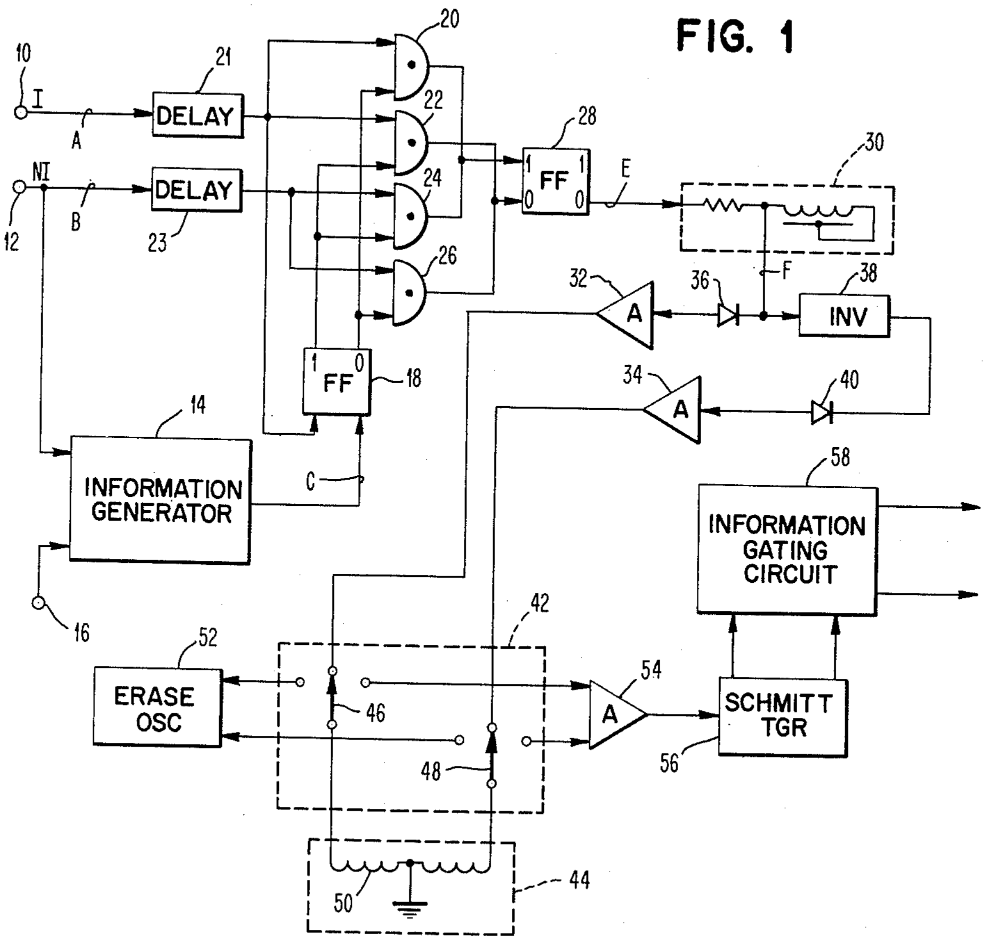

This invention relates to magnetic recording systems, and more particularly to magnetic recording systems having a high packing density.

With advances in the computer art, recording of binary signals on a recording medium, such as a tape or drum, is used extensively. One such system of recording information has involved magnetically recording electrical pulse signals. In this system, the particular type of binary bit of information represented, that is a "0" or a "1," is determined by the direction or phase of the pulse signal that is recorded. For example, if the recorded pulse signal is positive with respect to a zero reference point, it may represent a "1." If the recorded pulse signal is negative with respect to a zero reference point, it may represent a "0."

Such pulse recording systems have included various different methods of recording. For example, in one such system a pair of pulses, in which one pulse of a positive polarity is followed by a second pulse of negative polarity, may represent a "1." Likewise, a pair of pulses having a first pulse of a negative polarity followed by a second pulse of a positive polarity, may represent a "0."

Recording of pulses to represent binary information offers numerous advantages. One such advantage is that the problem of erasing a previously recorded signal by a subsequent signal is minimized. Since the pulse signals are spaced from each other some predetermined distance on the tape drum or other recording medium, the problem of overlapping information signals is minimized.

Another advantage of recording information signals by means of pulses which are spaced with respect to each other is that the peak head current necessary to record the information may be minimized. Because such low currents may be utilized, it is not necessary to saturate the recording medium in order to record the binary information. Consequently, a much greater number of pulses may be recorded on the recording medium without interference between adjacent signals or channels.

Another advantage in the use of pulse recording for information is that the pulse time may be made very short. Therefore, the surface of the recording medium may be considered stationary under the magnetic gap of the time of writing. This results in a magnetic pulse whose flux is symmetrical about the peak.

One problem encountered in pulse recording, especially when low level signals are recorded, is that each alternate pulse recorded must be of opposite polarities. This means that the writing of two or more consecutive pulses of the same polarity is prohibited. The reason for this is that the base or reference level of the recording medium will tend to drift if the system is not returned to zero for each pulse.

In pulse recording systems used heretofore, such as the double pulse method of recording mentioned above, the recording of a "1" bit of information followed by a "0" would mean that two consecutive pulses of the same polarity would be recorded. As mentioned, this results in the undesired effect of shifting the magnetic reference level thereby prohibiting the use of pulse recording in low signal level systems.

It is an object of this invention to provide an improved system for writing binary coded signals into a recording medium.

It is a further object of this invention to provide an improved magnetic writing system in which a maximum amount of binary coded information may be recorded on a recording medium.

In accordance with the present invention, a system for magnetically recording a series of binary coded information pulse signals is provided. A "0" type information signal is represented by a pulse of one polarity and a "1" type information signal is represented by a pulse of the opposite polarity. Means are provided for recording an additional pulse signal between two consecutive information pulses whenever the two consecutive pulses are of the same type, with the additional pulse being of the opposite type to the two consecutive pulses. This arrangement assures that the recording medium is restored to the same reference level for each applied information pulse.

Figure 2:
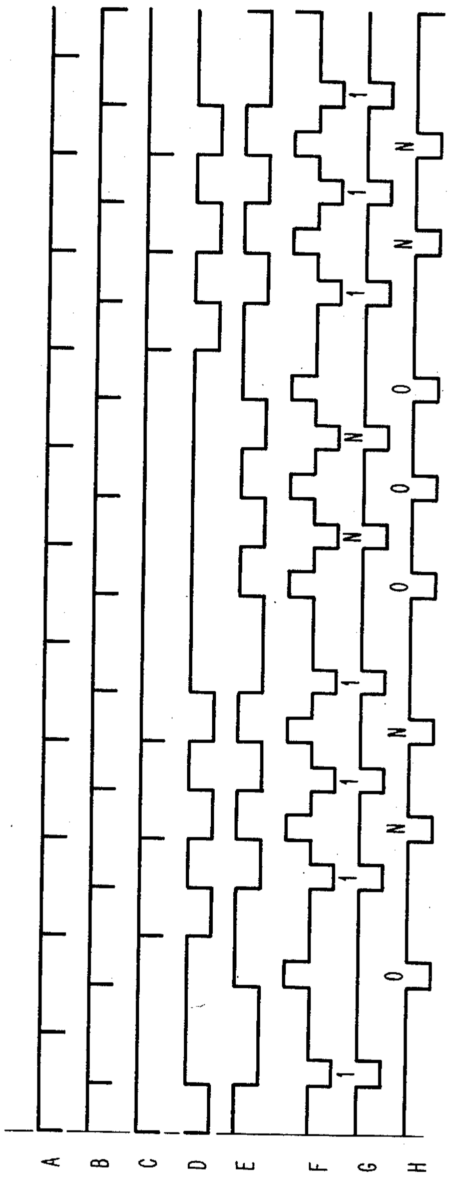

Other objects and advantages of the present invention will be applied and suggest themselves to those skilled in the art, from a reading of the specification and claims, in conjunction with the accompanying drawing, in which:

FIGURE 1 is a block diagram illustrating a magnetic recording system embodying the present invention, and FIGURE 2 is a series of waveforms, shown for the purpose of explaining the operation of the system illustrated in FIGURE 1.

In describing the present invention, it is assumed that a series of information signals 10111000111 is to be recorded on a recording medium.

Referring particularly to FIGURES 1 and 2, pulse clock signals are applied to a pair of input terminals 10 and 12. The time intervals between pulses of both sets of clock signals represent one information digit period. The clock signals from the input terminals 10, represented by a waveform A, leads the clock pulses from the input terminal 12, represented by the waveform B, by a one-half digit period. As will be described, it is these clock signals which are utilized to produce information as well as correction signals at an output circuit. One bit of significant information either a "1" or a "0," is recorded at each digit period.

The signals from the terminal 12 are applied to an information generator circuit 14. Information signals are also applied to the information generator 14 from an input terminal 16. The information generator 14 is programmed to generate output pulses for information signals representing "1's" and no output pulses to representing "0's." The information generator 14 may be considered a form of AND gate which produces an output pulse signal when input signals from both terminals 12 and 16 are applied thereto. The output pulse signal, representing "1" information is represented at the output circuit of the information generator 14 by a waveform C.

A pulse signal developed by the information generator 14 is applied to a flip-flop circuit 18 causing the zero side of the flip-flop circuit to be low. A half bit time later, if the pulse signal from the information generator 14 has caused the operating state of flip-flop circuit 18 to be low at its zero output side, pulses from the input terminal 10 are applied to switch it back to its original state wherein the one side of the flip-flop circuit 18 is low and the zero side is high. If no pulses are generated at the output circuit of the information generator 14, the operating state of the flip-flop circuit 18 remains unchanged from its last switched previous state, with the last pulse from the input terminal 10 determining its operating state.

The operating state of the flip-flop circuit 18, the output voltages of which are illustrated by the waveform D, controls the operations of negative AND gate circuits 20, 22, 24, and 26. The one output side of the flip-flop circuit 18 is applied to the input circuits of gate circuits 22 and 24. The zero output side of the flip-flop 18 is applied to the input circuits of gate circuits 20 and 26. Input pulse signals from the input terminal 10 are applied through a delay circuit 21 to the gate circuits 20 and 22. Likewise, input pulses from the input terminal 12 are applied through a delay circuit 23 to the gate circuits 24 and 26. A selected two of the four gate circuits are opened to permit pulse signals from the input terminals 10 and 12 to pass therethrough. The particular gate circuits opened are dependent upon the signal levels being applied thereto from the flip-flop circuit 18. For example, if a low level voltage level from the flip-flop 18 is applied to one of the gate circuits, that particular gate circuit will permit applied negative pulses to pass therethrough. On the other hand, if a particular gate circuit has a high level voltage applied thereto from the flip-flop 18, negative applied pulse will be permitted to pass therethrough.

Output pulse signals from the gate circuits 20 and 24 are applied to the one input side of a flip-flop circuit 28. In a like manner, output pulse signals from the gate circuits 22 and 26 are applied to the zero input side of the flip-flop circuit 28. The flip-flop circuit 28 maintains or assumes an operating state dependent upon the nature of the last pulse signal applied thereto. The output signal from the zero side of the flip-flop circuit 28 is illustrated by waveform E.

Output signals from the zero side of the flip-flop 28 are applied to a shorted delay line circuit 30. Pulse signals are developed by the shorted delay line circuit whenever the flip-flop circuit 28 changes states. These output pulses, represented by waveform "F," represent both the binary coded information and nonsignificant pulses to be recorded on a recorded medium, as will be seen.

Shorted delay line circuits are well known to those skilled in the art. In general a signal fed into such a line travels to the end of the line and returning 180 degrees out of phase with original signal. This in effect causes cancellation of most of the original signals with the remaining signal being a pulse the duration of which being determineed by the time involved for a signal to travel down.

The operation of the system illustrated after the shorted delay line circuit 30 involves conventional circuits for performing reading, writing, and erasing of information on the recording medium. These circuits will be discussed in detail later in the specification.

In considering the operation of the circuit discussed so far, first assume that a series of single pulses of positive polarity representing "1's" is applied to the system for recording. Prior to the present invention, when two or more consecutive applied pulses were of the same polarity, the reference level associated with the recording medium tended to shift. Even slight shifting of this reference level on the recording medium tends to make the system impractical when relatively low amplitude signals are to be recorded. The reason for this is that after a consecutive series of information pulses of the same polarity, a subsequent information pulse signal of the opposite polarity would not be of sufficient amplitude to drive the recording medium back beyond the original reference point to represent information in an opposite magnetic direction. One of the features of the present invention makes it possible to record single pulse binary information without the disadvantage of a shifting reference level.

Since a series of pulse signals of the same characteristic causes a shifting of the reference level on the recording medium, means are provided in the present invention to return the system to its reference level for each recorded information pulse. When consecutive signals are of opposite polarities such as a "1" followed by a "0," the system is automatically returned to its reference level. Whenever two consecutive signals are of one characteristic, however, a correction pulse of the opposite characteristic must be recorded in order to return the recording medium to its reference level.

In considering the system illustrated, a comparison of the waveforms in FIGURE 2 disclose that output information pulse signals represented by waveform F, are produced at the shorted delay line circuit 30 for each pulse signal at the input terminal 12. A correction or nonsignificant pulse is produced at the shorted delay line circuit during the application of some of the pulses from the input terminal 10. These correction pulses are produced only when two consecutive information signals of the same characteristic are applied to the system. When the applied information signals are alternate "1's" and "0's," no correction pulses are produced by the shorted delay line circuit 30.

A series of "1's" applied to the system causes the flip-flop 18 to change states at twice the information rate. Pulses from the information generator 14 change the operating state of the flip-flop 18 to one state and one-half a digit period later, pulses from the input terminal 10 changes the flip-flop back to its original state. The changing of the operating states of the flip-flop 18 at twice the information rate by a series of consecutive pulses of the same characteristic also causes the flip-flop 28 to be changed at twice the information rate thereby producing pulses representing "1" information as well as correction pulses at the shorted delay line 30.

When a "1" information pulse is applied from the information generator 14 to the flip-flop circuit 18, the "0" output side of the flip-flop 18 may be considered low. At this point, the negative gate circuits 20 and 26 will permit negative applied pulses to pass therethrough. With the "0" side of the flip-flop 18 low, pulses from the input terminal 12 are applied through the gate circuit 26 to switch or maintain the operating state of the flip-flop 28 so that its "0" output side is at a low level. When the operating state of the flip-flop 28 changes such that its "0" output side switches from a high level to a low level, a negative pulse representing a "1" bit of information is produced at the shorted delay line 30.

When the "0" side of the flip-flop circuit 18 is low, the "1" side is high. The "1" side of the flip-flop 18 is connected to the gate circuits 22 and 24 to inhibit any applied signals from passing therethrough to effect the operating state of the flip-flop circuit 28. One-half a digit period after a pulse from the input terminal 12 has been applied, a second pulse from the input terminal 10 is applied to the gate circuit 20 to reswitch the flip-flop circuit 28. When the flip-flop circuit 28 reswitches or changes states, its "0" output side becomes high. This causes a positive pulse signal to be produced at the shorted delay line 30. This latter pulse signal is positive in polarity and is considered to be a non-significant or correction pulse.

Having considered the operation of the system when "1's" are applied, let us now consider the operation of the system when "0" information signals are applied. Under these conditions, no output pulses are developed by the information generator 14. The flip-flop circuit 18 will therefore remain in a state as determined by the last pulse from the input terminal 10. In this state, the "1" side of the flip-flop circuit 18 is at a low level and the "0" side is at a high level. The "1" side of the flip-flop circuit 18 is connected to gate circuits 22 and 24. With a low level signal from the flip-flop 18 being applied to the gate circuits 22 and 24, pulse signals applied to either of these gate circuits will pass therethrough. When the "1" side of the flip-flop circuit 18 is low, the "0" side is high. Since the "0" side is connected to the gate circuits 20 and 26, these gate circuits are inhibited from passing any pulses applied thereto.

Pulses from the input terminal 12 pass through the delay circuit 23 and the gate circuit 26 to the flip-flop circuit 28. Whenever the flip-flop 28 changes state, an output pulse signal is developed at the shorted delay line 30. A positive pulse signal represents a "0." One-half digit period later, a pulse from the input terminal 10 is applied through the delay circuit 21 and the gate circuit 22 to the "0" input side of the flip-flop 28 causing the flip-flop 28 to switch operating states. When the flip-flop 28 changes states, a negative pulse signal is produced at the shorted delay line 30. The latter negative pulse signal represents a non-significant or correction pulse.

Thus it is seen that whenever two consecutive signals of the same characteristic are applied to the system illustrated that both information and correction pulses are produced at an output circuit, such as the shorted delay line 30. The correction pulses are of opposite polarity to the pulses representing the information.

Let us now consider the operation of the system illustrated when a series of alternate "1" and "0" information signals, such as 010101, are applied to the system. Under these conditions, no correction pulses are required.

When a "1" information signal is applied to the terminal 16, the flip-flop 18 is set to condition in which its "0" output side is at a low level to open the negative gate circuits 20 and 26. Pulses from the input terminal 12 are passed through the gate 26 to the "0" input side of the flip-flop circuit 28, to switch its "0" output side to a low level. It is noted that the delay circuit 23 is employed to permit time for the flip-flop 18 to switch states to permit appropriate signals to pass through the gate circuits. When the flip-flop circuit 28 switches to produce a low level at its "0" output side, a negative pulse is developed at the delay line 30. A half digit time later, the operating state of the flip-flop 18 is switched by a pulse from the input terminal 10. The switching of the flip-flop 18 causes its "1" output side to be low and its "0" output side to be high. The gate circuits 22 and 24 become open. A pulse signal from the input terminal 10 is applied through the gate circuit 22 to the "0" input side of the flip-flop 28. This latter pulse has no effect upon the operating state of the flip-flop 28 snice its operating state has already been changed by the previous pulse from gate circuit 26. Consequently, since the flip-flop 28 does not change states, no output pulse is developed at the delay line circuit 30. As in the case of the delay circuit 23, the delay circuit 21 is employed to permit time for the flip-flop 18 to switch states and apply the proper signals to the gate circuits.

When the next information signal "0" is applied to the system, no output pulse signal is produced at information generator 14. The flip-flop circuit 18 will therefore remain in its previous state, with its "0" side high and its "1" side low. The high "1" output signal level from the flip-flop 18 is applied to the gate circuits 22 and 24. A signal from the input terminal 12 is permitted to pass through the gate 24 to the "1" input side of the flip-flop 28 to switch the operating state therefrom a high level to a low level. A change in the operating state of the flip-flop 28 produces an output positive pulse at the shorted delay line circuit 30. This positive pulse represents a "0" bit of information.

An input pulse signal from the input terminal 10 applied one-half digit period after the pulse from the terminal 12 is permitted to pass through the gate circuit 24 to "1" input side of the flip-flop 28. However, this latter pulse will not be effective to change the operating state of the flip-flop state 28 since it is applied to the same input as the previous pulse. Consequently, no output pulse signal is produced by the delay line circuit 30.

It is thus seen that pulse signals from the input terminal 12 are applied to the flip-flop circuit 28 each digit period. These input pulses will change the operating state of the flip-flop 28 each digit period. Pulse signals from the input terminal 10 will also be applied to the flip-flop circuit 28 each digit period. However, these latter pulses are effective to switch the operating states of the flip-flop 28 only if pulses are applied to the proper input side which would make it responsive to be switched. This will be true only when two consecutive signals of the same characteristic are applied to the system whereby the flip-flop 18 is set to open the proper gate circuits.

After the information and correction pulse signals are generated by the shorted delay line circuit 30, they are passed to subsequent circuits for recording. The shorted delay line 30, not only creates the pulses of the proper plurality but also determines the width of the pulses to be recorded. It is noted that the signals represented by waveform F include pulse signals which represent "1" and "0" information, as well as correction or non-significant pulses. It is also noted that the correction pulses appear between the information pulses and are of opposite polarity to the two consecutive pulses on either side.

Information pulses representing "1" are applied through a diode 36 to a driver amplifier 32. Correction signals of the same polarity as the "1" information signals are also applied through the diode 36 to the amplifier 32. These signals are represented by waveform G, with the correction pulses being designated "N."

The signals represented by the waveforms F are also applied to an inverter circuit 38. The output signals from the inverter 38, which are substantially the same as that illustrated by waveform F except for reversed polarity, are applied through a diode 40 to a driver amplifier 34. The output signals from the amplifier 34 is illustrated by the waveform H. Waveform H includes "0" information pulses as well as correction pulses "N." The respective output signals from the drivers 32 and 34 are applied through a switching device 42 to a magnetic reading and writing head 44.

The switching device 42 includes a pair of movable contact arms 46 and 48 disposed to engage selected electrical contacts. When the movable arms 46 and 48 are centrally positioned as illustrated, the system is set to write signals into the magnetic head 44. The magnetic head 44 may be associated with either a magnetic tape or drum (not illustrated) to write information signals thereon. The magnetic head 44 includes a center taped winding 50 to permit the reading and writing of signals of both polarities. Such an arrangement is well known to those skilled in the art.

While not directly related to the present invention, there is illustrated means for erasing information on the recording medium. This means may include an erase oscillator 52, which is designed to apply an erase signal through the coil 50 when the movable contact arms 46 and 48 engage the contacts of the switch which are disposed towards the left position.

The system is also adapted to read out signals from a recording medium which are developed in the coil 50 when the movable contact arms 46 and 48 disposed towards the right position. The signals read out are applied through an amplifier 54 to a Schmitt trigger circuit 56. The output signal from the Schmitt trigger circuit may be substantially rectangular in form. This signal is used to produce a series of pulses which are developed for each change in direction of the signal from the Schmitt trigger circuit 56. Output signals representing "1" and "0" information are then passed to an information gating circuit 58 which gates the bits of information to the proper channels and removes the correction or non-significant pulse which may have been deliberately or otherwise inserted in the system during the writing operation.

The present invention is not particularly related to the means for reading out signals from a recording medium and hence, details of such means are not illustrated. Furthermore, such read out means are well known to those skilled in the art.

Most of the elements illustrated are shown in the forms of blocks. The reason for this is for simplicity in explanation because the circuitry which would be included in such blocks are well known to those skilled in the art. For example, the flip-flop circuits 18 and 28 may be of the conventional type which will change operating state upon the application of a pulse signal of the proper polarity to the proper input circuit. Likewise, the gate circuits 20, 22, 24 and 26 may be conventional AND gate circuits which produce output signals only when all the input signals are at high levels.

What is claimed is:

1. A system for generating a series of information signals represented by pulses of either a first or second type comprising means for generating a pulse signal between two consecutive information signals whenever said consecutive signals are of the same type, said pulse signal being of the opposite type to said consecutive pulses, and means for preventing said pulse signal from being generated if said consecutive signals are of different types.

2. A magnetic recording system for generating a series of information signals represented by pulses of either a first or second type comprising means for generating said information signals, means for generating a correction pulse signal between two consecutive information signals whenever said consecutive signals are of the same type, said correction pulse signal being of the opposite type to said consecutive pulses, and means for preventing said correction pulse signal from being generated if said consecutive signals are of different types.

3. A magnetic recording system for generating a series of binary coded information signals represented by pulses of either a first or second polarity with respect to a point of reference potential comprising means for generating said information signals, means for generating a correction pulse signal between two consecutive information signals whenever said consecutive signals are of the same polarity, said correction pulse signal being of the opposite polarity to the polarity of said consecutive pulses, and means for preventing said correction pulse signal from being generated if said consecutive signals are of different type.

4. A magnetic recording system for generating a series of binary information signals represented by pulses of either a first or second type comprising first and second sources of periodically recurring pulse signals occurring once per digit period and at different time intervals, means responsive to pulse signals from said first source for producing pulses representing said information signals, means responsive to the pulse signals from said second source to produce correction pulse signals between two consecutive pulses representing information signals whenever said consecutive signals are of the same type, said correction pulse signals being of the opposite types to said consecutive pulses, and means for preventing said correction pulse signals from being produced if said consecutive signals are of a different type.

5. A magnetic recording system for generating a series of binary information signals represented by pulses of either a first or second type comprising first and second sources of periodically recurring pulse signals occurring once per digit period and at one half a digit period of different time intervals, a source of binary information signals, means responsive to pulse signals from said first source and said information signals for producing pulses of a positive or negative type to represent said binary information signals, means responsive to the pulse signals from said second source to produce correction pulse signals between two consecutive pulses representing said binary information signals whenever said consecutive signals are of the same type, said correction pulse signals being of the opposite types to said consecutive pulses, and means for preventing correction pulse signals from being produced if said consecutive signals are of a different type.

6. A magnetic recording system for generating a series of binary information signals represented by pulses of either a first or second type comprising first and second sources of periodically recurring pulse signals occurring once per digit period and at different time intervals, a source of binary coded information signals, means including a flip-flop output circuit connected to receive pulse signals from said first source and said information signals from said source of information signals for producing positive and negative pulses representing said binary information signals, said flip-flop circuit further being connected to receive the pulse signals from said second source to produce correction pulse signals between two consecutive pulses representing said binary information signals whenever said consecutive signals are of the same type, said correction pulse signals being of the opposite types to said consecutive pulses, and means for preventing said correction pulse signals from being produced if said consecutive signals are of a different type.

7. The invention as set forth in claim 6 wherein gating means are connected between said first and second sources and said flip-flop output circuit.

8. The invention as set forth in claim 7 wherein a second flip-flop circuit is provided to control said gating means.

9. The invention as set forth in claim 8 wherein said information signals from said source of information signals controls said second flip-flop circuit.

10. The invention as set forth in claim 9 wherein pulses from one of said first or second sources is applied to said second flip-flop circuit.

11. A magnetic recording system for recording binary coded information comprising a source of pulse signals occurring at periodic intervals once per digit period, a second source of pulse signals occurring at periodic intervals once per digit period, said pulse signals from said first and second sources being spaced one half a digit period with respect to each other, a source of binary information signals occurring once per digit period wherein one type of information is represented by a pulse and another type of information is represented by the absence of a pulse, an output flip-flop circuit having a set and reset input means and an output means, a pulse former circuit having input and output circuits, means for connecting the output means of said output flip-flop circuit to said input circuit of said pulse former circuit to produce a positive or negative pulse whenever said output flip-flop circuit changes state, a utilization circuit, means for connecting the output circuit of said pulse former circuit to said utilization circuit, first and second gating means, an input flip-flop circuit having an input side and high and low output sides, said high and low output sides being connected to said first and second gating means, means for applying output signals from said source of binary information to said input side of said input flip-flop circuit, and means for applying pulses from said first source to either the set or reset input means of said output flip-flop circuit through either one of said first or second gating means whereby information pulses are produced at said pulse former circuit, and means for applying pulses from said second source to either the set or reset input means of said output flip-flop circuit through either one of said first or second gating means to cause correction pulses to be produced at said pulse former circuit.

12. A magnetic recording system comprising a source of pulse signals occurring at periodic intervals once per digit period, a second source of pulse signals occurring at periodic intervals once per digit period, said pulse signals from said first and second sources being spaced one half a digit period with respect to each other, a source of binary information signals occurring once per digit period wherein one type of information is represented by a pulse and another type of information is represented by the absence of a pulse, an output flip-flop circuit having a set and reset input means and an output means, a pulse former circuit having input and output circuits, means for connecting the output means of said output flip-flop circuit to said input circuit of said pusle former circuit to produce a positive or negative pulse whenever said output flip-flop circuit changes state, a utilization circuit, means for connecting the output circuit of said pulse former circuit to said utilization circuit, first and second gating means, an input flip-flop circuit having an input side and high and low output sides, said high and low output sides being connected to said first and second gating means, means for applying output signals from said source of binary information to said input side of said input flip-flop circuit, means for applying pulses from said first source to either the set or reset input means of said output flip-flop circuit through one of said gating means dependent upon the type of signal at said information source whereby a pulse is developed at said pulse former circuit, the polarity of said pulse being determined by the direction of switching of said output circuit, said output flip-flop circuit switching operating states at least once each digit period, and means for applying pulses from said second source to either the set or reset input means of said output flip-flop circuit to cause said output flip-flop circuit through either one of said first or second gating means to switch whenever two consecutive bits of information from said binary information source are of the same types.

References Cited in the file of this patent

UNITED STATES PATENTS 2,954,267 Canepa -------------- Sept. 27, 1960